United States Patent [19]
Slocum

[11] Patent Number: 6,150,740
[45] Date of Patent: Nov. 21, 2000

[54] LINEAR MOTION CARRIAGE SYSTEM AND METHOD WITH BEARINGS PRELOADED BY INCLINED LINEAR MOTOR WITH HIGH ATTRACTIVE FORCE

[75] Inventor: Alexander H. Slocum, Bow, N.H.

[73] Assignee: Aesop, Inc., Concord, N.H.

[21] Appl. No.: 09/235,015

[22] Filed: Jan. 21, 1999

[51] Int. Cl.[7] .................................................. H02K 41/00
[52] U.S. Cl. ............................................................. 310/12
[58] Field of Search .................................. 310/12, 13, 14

[56] References Cited

U.S. PATENT DOCUMENTS

| | | | |
|---|---|---|---|
| 4,985,651 | 1/1991 | Chitayat | 310/12 |
| 5,488,771 | 2/1996 | DeVitt et al. | 29/898 |

*Primary Examiner*—Nestor Ramirez
*Assistant Examiner*—Judson H. Jones
*Attorney, Agent, or Firm*—Rines and Rines

[57] ABSTRACT

A system and method of preloading linear motion bearings arranged to move between two orthogonal surfaces of each of a rail and an overlapping carriage, wherein a permanent magnet linear electric motor with a high attractive force between the coils and the magnets is inclined at an acute angle to the surfaces, such that the attractive force creates a preload force on each of the bearings; the magnet being fixed as a track in a trough along the rail, and the coils being recessed in a groove in the inner top surface of the carriage, both oriented at said acute angle, and providing through such preloading, a high degree of stiffness and load capacity in all degrees of freedom of the carriage except in the linear direction of movement along the rail.

11 Claims, 7 Drawing Sheets

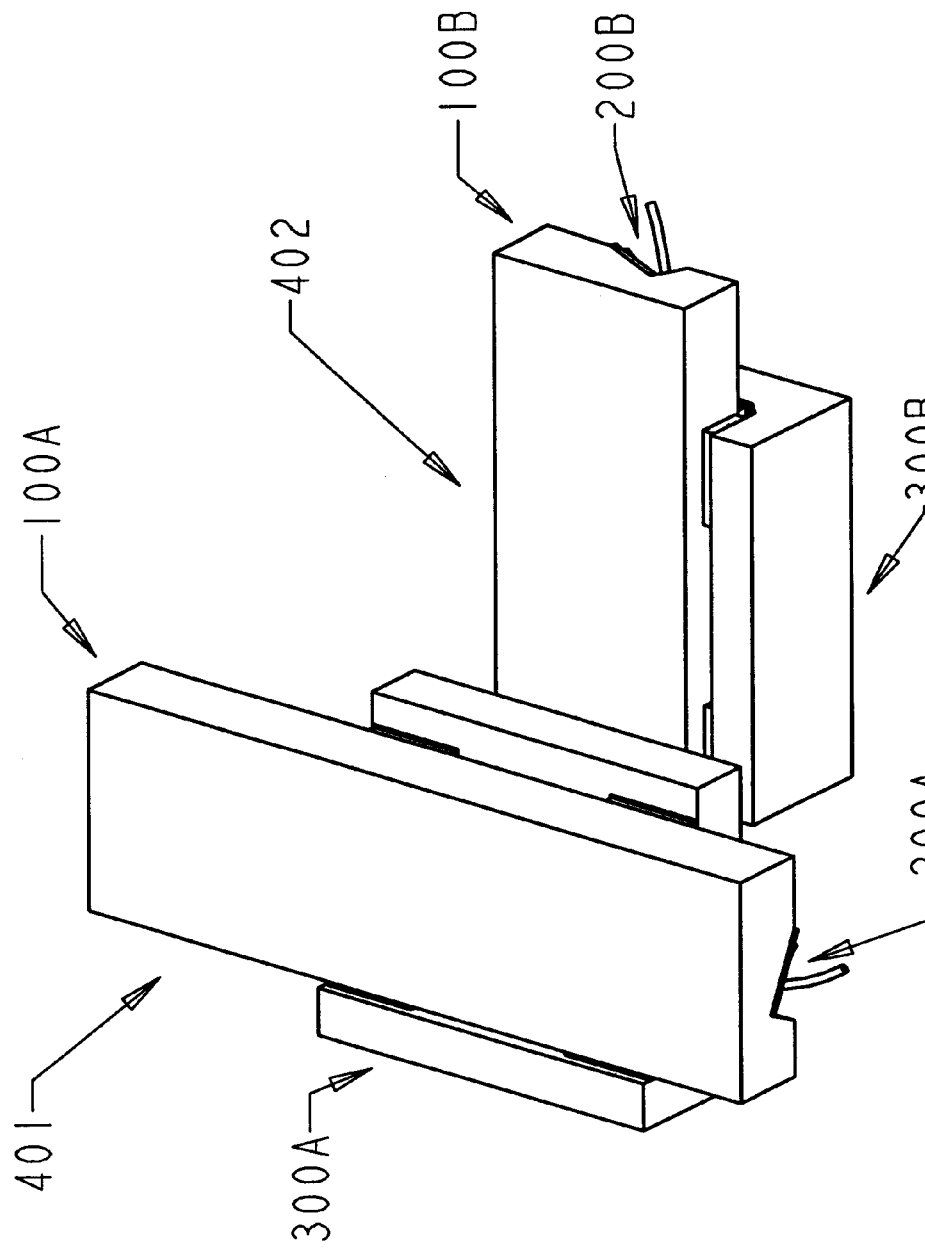

LINEAR MOTION CARRIAGE SYSTEM AND METHOD WITH BEARINGS PRELOADED BY INCLINED LINEAR MOTOR WITH HIGH ATTRACTIVE FORCE

The present invention relates to linear motion systems where a single attractive preload source, such as magnetic or vacuum, is applied to a linear motion carriage such that it preloads an arrangement of bearings, such as air bearings, to uniquely define the position of the carriage and provide a high degree of stiffness and load and moment carrying capacity.

BACKGROUND

Linear motion axes are ubiquitous in manufacturing systems. For high speed or high accuracy systems, rolling element bearings or pressurized fluid bearings dominate. In the latter case, air bearings are often used. In order for air bearings to be used, however, they must be preloaded, which means that the carriage supporting the air bearings must wrap around the linear motion axis and the bearings must act on all sides of the axis structure. In addition, the axis structure must be machined with all sides extremely straight and parallel, or else varying distances between surfaces will cause the air bearing pads to touch down and fail.

Some designers try to overcome this by utilizing springs to preload one set of bearing pads; but, this adds to complexity. Others use vacuum pads to preload air bearings, thereby eliminating the need to wrap around the structure. Vacuum, however, can only generate an order of magnitude less force than can the air bearings themselves; and, therefore, vacuum preloaded air bearings systems are not good at resisting overturning moments. In addition, for vertical motion travel, if the vacuum is lost, the system can fall apart and crash catastrophically.

One of the earliest precision linear motion systems, which still enjoys widespread use, is the so-called Vee and Flat configuration. The rail, upon which the carriage rides, has a Vee-way protrusion and a Flat-way, as later discussed in connection with FIG. 1. The carriage has a mating Vee and Flat, and gravity preloads the system. The bearings for Vee and Flat systems can be sliding, rolling, hydrostatic, or aerostatic. In addition, linear electric motors with high attractive forces have been used. The principal problem with Vee and Flat systems, or double Vee systems for that matter, is that grinding the required precision angled surfaces is more complex and less accurate than grinding rectangular shapes. In addition, for the Vee and Flat system, there are three precision surfaces that must be created for the bearings. The generation of accurate rectangular shapes is well documented in W. Moore's *Foundations of Mechanical Accuracy*, published by Moore Tool Company, Bridgeport, Conn., which discusses how making a straight edge with right angle surfaces is a fundamental step, and how making Vees is a step that follows from it, such that rectangular shapes can fundementally be made more accurate.

Furthermore, with respect to accuracy, a Vee and Flat design has coupled motions. A horizontal force, resisted by the bearings on the Vee, causes deflections in the bearings that engage the Vee and this results in an error motion not only in the horizontal direction, but also in the vertical direction. Since the vertical error component only occurs over the Vee, the supported carriage also incurs a roll error motion. Double Vee way systems partially overcome this problem with the use of two Vees, but there is still coupled motion in the vertical direction. In addition, double Vee way systems are very difficult to manufacture to obtain parallelism between the Vees.

Many high-speed systems use linear electric motors because they provide a simple design with extremely high acceleration rates and high servo stiffness. Many permanent magnet motors, however, have a very high attractive force between the coils and the magnets. For example, if a motor has 1000 N of linear motion force, it may have 6000 N of attractive force. Until the advent of the present invention, indeed, such high motor forces acted only in one direction, thereby only preloading one set of air bearings, unless the more complex Vee and Flat arrangement is used, as discussed above; and the high attractive forces greatly decreased the life of rolling element linear motion bearings.

A significant manufacturing development towards attaining low cost aerostatic bearing systems was provided in U.S. Pat. No. 5,488,771, "Method for Manufacturing Externally Pressurized Bearing Assemblies", of common assignee herewith. In accordance with the teaching of this patent, the fluid bearings are suctioned to a bearing rail by vacuum, and then the carriage is positioned over the bearings and aligned. An epoxy is then injected between the bearings and the carriage. This same method is also useful in the implementation of the present invention, as later explained, with the significant addition, provided by the invention, of unique angular positioning of the linear electric motor with respect to the bearings, which ride on a very simple and accurate rectilinear bearing rail.

OBJECTS OF THE INVENTION

A primary object of this invention is to provide a new and improved linear motion system, which is not subject to the manufacturing and operational limitations above discussed; but that, to the contrary, enables the use of accurate manufacturable flat bearing surfaces and provides uniform preload forces to all the bearings of the system, attaining also improved accuracy.

A further object is to provide a novel system wherein the structural axis of the system requires only two precision flat bearing surfaces and a third flat preload surface, with all three surfaces being perpendicular to a common end plane, and with the third flat preload surface being at an acute angle to the two bearing surfaces An important further object is to provide a novel permanent magnet linear electric motor actuated system wherein the bearings uniquely define the position in five degrees of freedom of the carriage, and wherein the motor is mounted parallel to the axis of motion of the bearings, but at an angle to the planes of the bearings, such that the attractive force between moving (coil) and fixed (track) parts of the motor approximately equally preloads all of the bearing pads, thereby creating a linear motion system with a high degree of stiffness and load capacity in all five degrees of freedom, and with a cost-saving minimum of precision machined surfaces.

Another object is to provide such a novel system wherein a preload force may be applied between the carriage and the preload surface on the structural surface, such that the force vector provides uniform preload forces to all of the bearings.

Still a further object of the invention is provide such preload force through the use of a one-sided permanent magnet linear electric motor, wherein the moving member is attached to the carriage, and the fixed member, typically the magnet track, is attached to the preload surface on the structural surface.

Still another objective is to provide a novel geometry of surface features that can also readily accommodate modular linear ball bearings so as to make the entire system itself more modular.

An additional object is to provide a bearing support geometry where the axes of support are fully decoupled, so deflection in one axis does not create error motions in the other axis.

Other and additional objects will be explained hereinafter and they are more fully delineated in the appended claims.

SUMMARY

In summary, from one of its important specific aspects, the invention embraces a linear motion carriage-rail system having longitudinally extending opposing inner planar carriage and rail surfaces between which linear motion bearings are disposed to enable the carriage to move longitudinally over the rail, the system having, in combination, a linear electric motor having a forcer coil part and a longitudinally extending magnet track part; the forcer coil part being fixed to an intermediate region of said planar carriage inner surface to move the carriage longitudinally over the rail; and with the magnet track being fixed to, and intermediately longitudinally along, the inner planar surface of the rail but oriented at an acute angle to the plane of the rail surface, such that the attractive force between said motor parts approximately equally preloads the bearings as the carriage is moved over the rail.

In a broader sense, the invention provides a method of preloading linear motion bearings disposed between opposing fixed and movable surfaces each comprising a pair of orthogonal planar surfaces, that comprises, positioning a permanent magnet linear electric coil motor with a high attractive force between the coils and the magnet, upon and at an acute angle incline to the planar surfaces, such that the attractive force creates a preload force on each of the bearings.

Preferred and best mode embodiments are hereinafter described.

DRAWINGS

The invention will now be described with reference to the accompanying drawing in which:

FIG. 6 is an isometric view of an XY robot made by crossing two axes; and

PREFERRED EMBODIMENT(S) OF THE INVENTION

Figure 1:
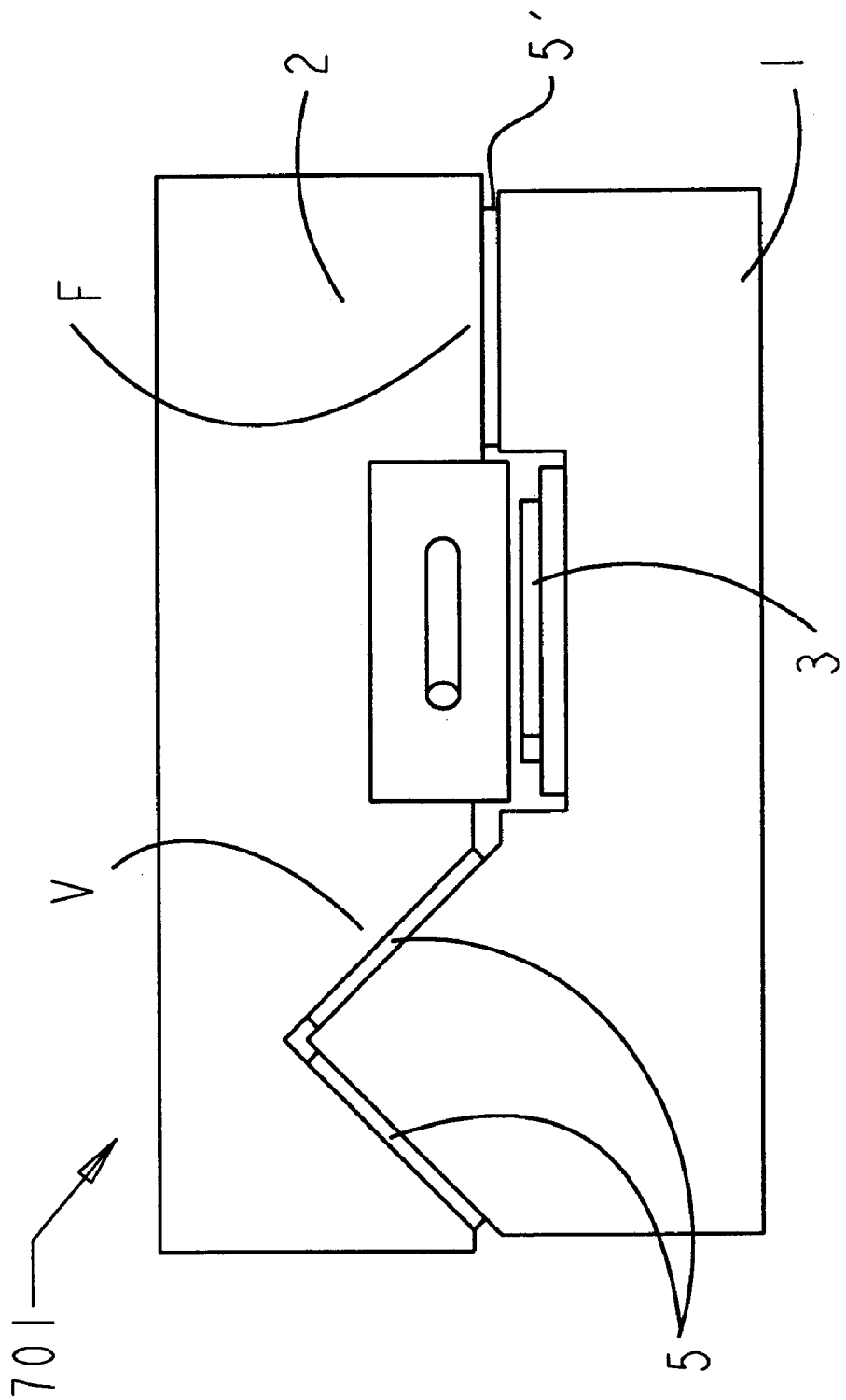
FIG. 1 is a transverse section of the above described prior art Vee and Flat system.

As before described and shown in FIG. 1, prior art Vee protrusions (V) and Flat ways (F) have heretofore been provided on carriage 2 riding along rails 1 upon bearings 5 and 5' under the drive of a motor 3, presenting, however, the operational and grinding manufacturing accuracy and cost limitations earlier described.

Figure 2:
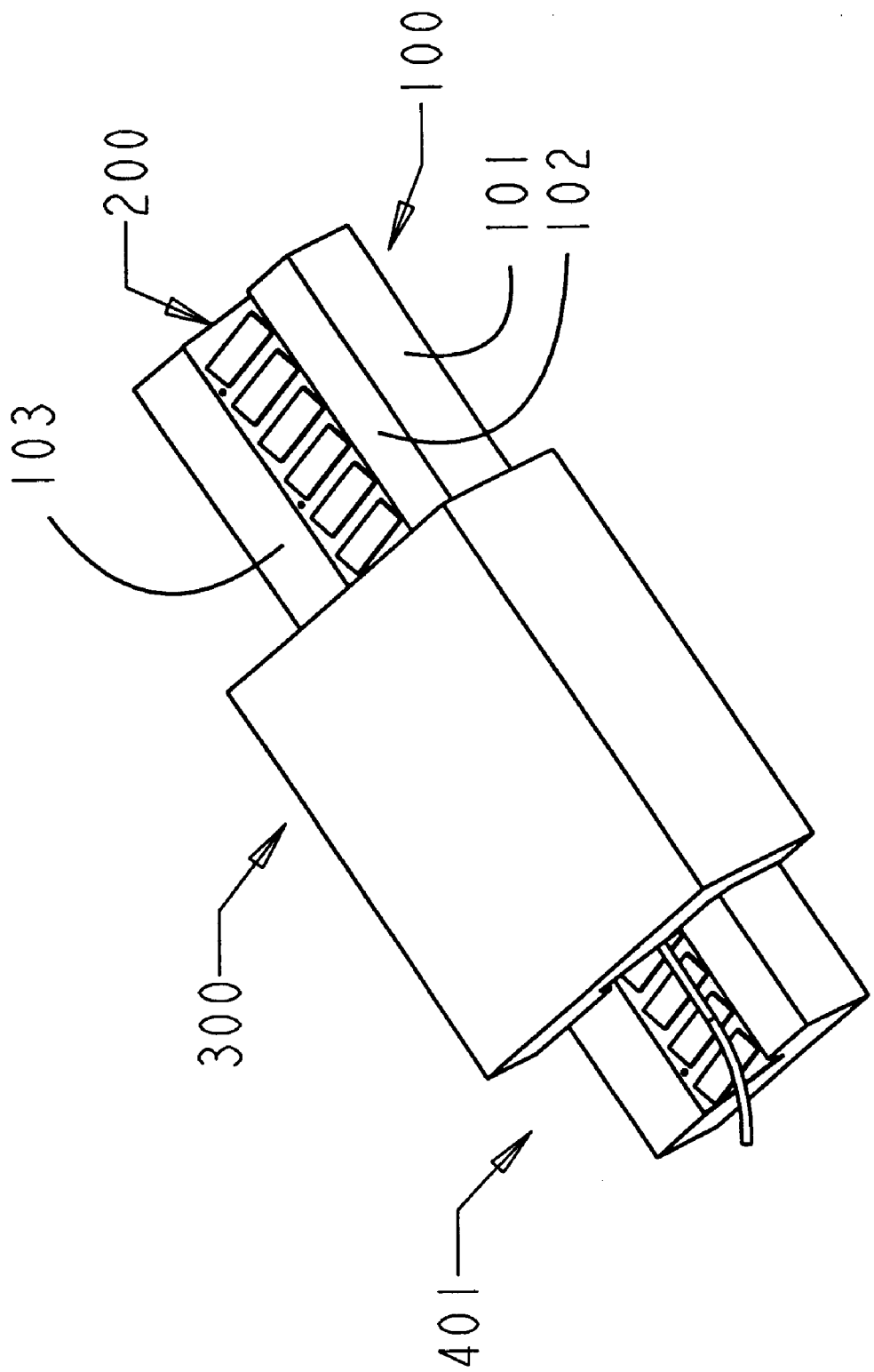
FIG. 2 shows an isometric view of a linear motion assembly constructed in accordance with a preferred embodiment of the present invention and wherein the carriage is supported by air bearings preloaded to the rail by the magnetic attraction force of the motor.

The present invention provides a novel construction that obviates these problems, as shown in FIG. 2. A single axis system is used comprised of a rail 100 with precision bearing surfaces 102 and 103 which are typically planar so that they can be created with a single grinding operation and then easily checked simultaneously for flatness using a surface plate. Bearing surface 101 is typically orthogonal to surface 102, and thus it is most easily and economically produced and inspected. The linear drive motor 200, instead of having the positional mounting of the prior art systems as in FIG. 1, is mounted in accordance with the invention, in an angled trench with respect to the bearing surfaces. Carriage 300 rides on the bearing rail.

Figure 3:
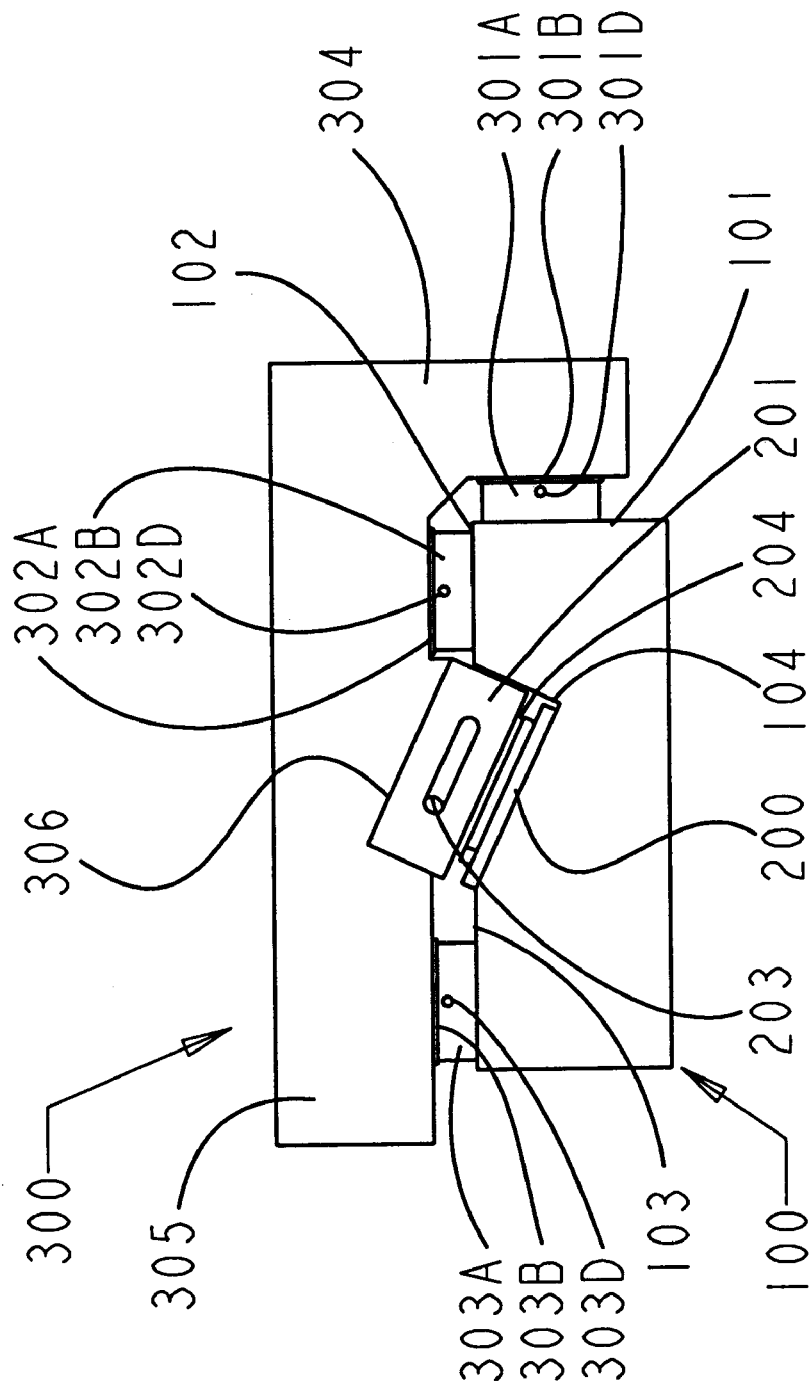
FIG. 3 is an end view of the assembly of FIG. 2, showing the orientation of the motor to provide even preload to all the bearings.
Figure 5:
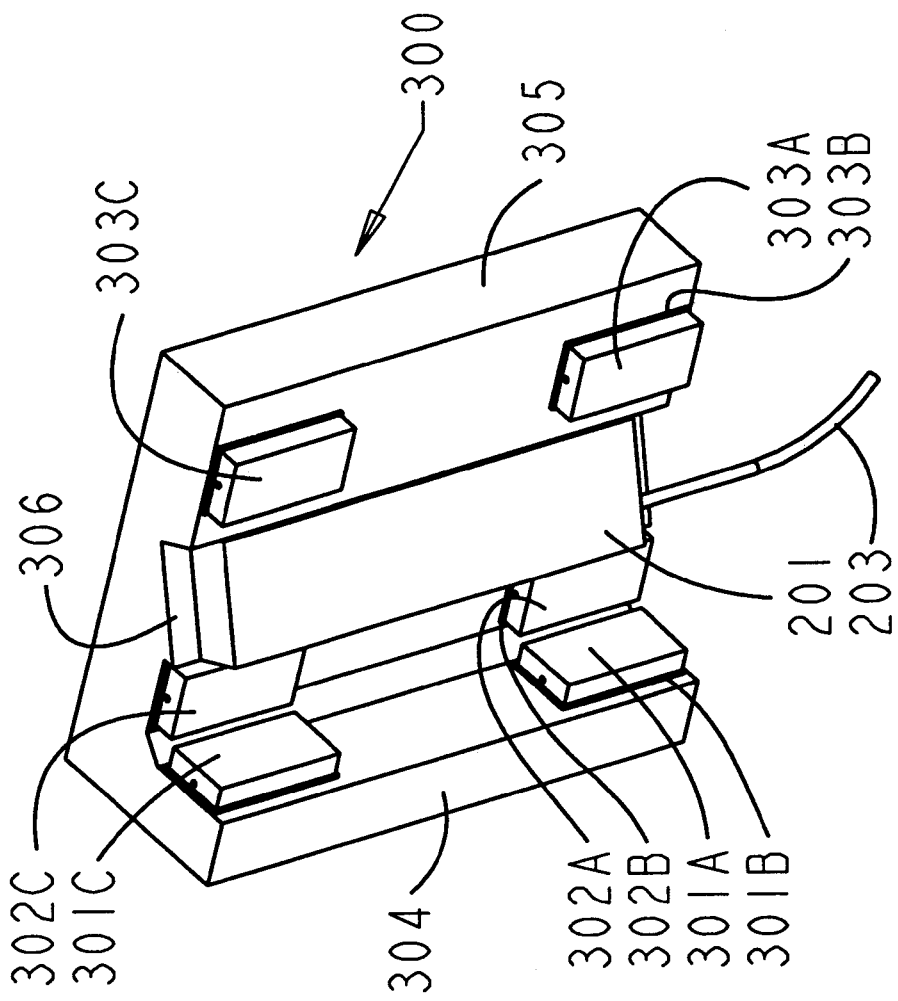
FIG. 5 is an isometric view of the underside of just the carriage.

As shown in FIGS. 3 and 5, carriage 300 has a wide flat part 305 and a short orthogonal extension 304 forming an L-shape, overlapping the side 101 of the rail. The bearings 302A and 303A and their counterparts in the direction of the page, 302C and 303C in FIG. 5, are for controlling vertical and pitch and roll motion degrees of freedom. Bearing 301A, between the carriage extension 304 and rail side 101, and its counterpart in the direction of the page, 301C in FIG. 5, restrains horizontal and yaw motions of the carriage, such that the bearings collectively uniquely define position in the five degrees of freedom of the carriage apart from its intentional free motion over the rail. The bearings 301A, 302A, and 303A are typically suctioned down to the rail surfaces 101, 102, and 103 by their supply ports 301D, 302D, 303D. The carriage 300 would be positioned so that the linear motor forcer coils 201 attached to the acute angled groove region 306 and powered by cable 203, is separated from the magnet track 200 by a gap 204. For easy manufacture, epoxy layers 301B, 302B, and 30BA are then injected into the gaps between the bearings and the carriage, preferably in the manner of said earlier described patent. When the epoxy hardens, the air is turned on, and the carriage lifts only by tens of microns so that the system is then operational. Of course a system can be manufacturered where precision bearing surfaces are machined to allow the system to be manufacturered merely by the accurate assembly of machined parts, or even the machining of a monolithic carrriage with integral bearings.

It should be noted that the novel inclined angle of the motor mounting in the invention enables the preload force to be applied to all of the bearings. This is critical to providing the carriage with high stiffness in five degrees of freedom, and is thus quite advantagious over prior art mountings. Furthermore, forces applied to the carriage in one direction, e.g., perpendicular to surface 102, will not cause deflections in the orthogonal direction. And since air bearings are very rigid, any microscopic deflections that do occur are not significant with respect to causing any variations in the motor attractive force. Thus the horizontal and vertical directions are not coupled, as is the case with a Vee and Flat bearing arrangement.

Figure 4:
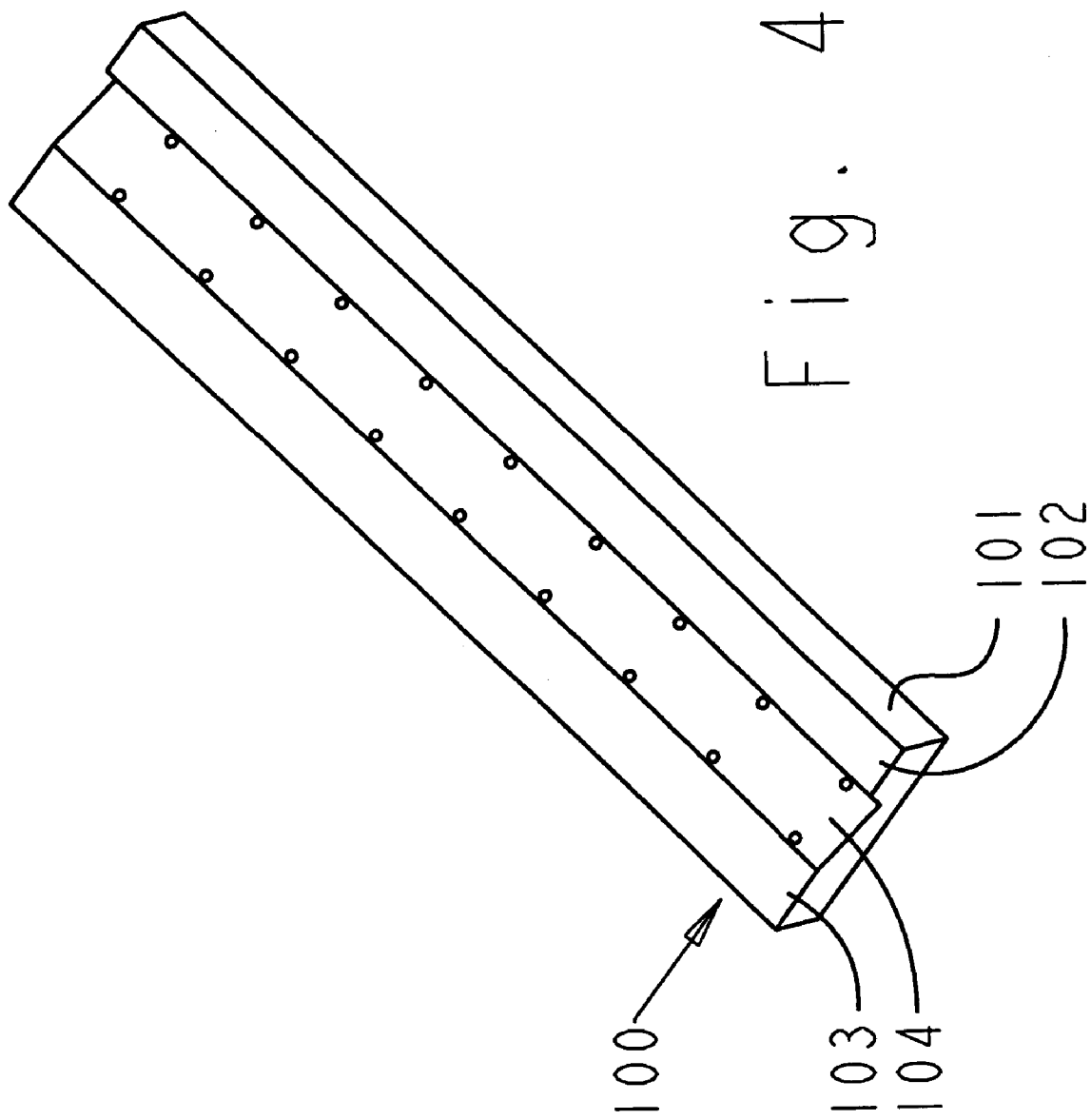
FIG. 4 is an isometric view of just the structural rail.

FIG. 4 shows in greater detail a typical rail 100 of the invention with its bearing surfaces 102 and 103, which are planar, and easily manufacturable as essentially orthogonal rectangular surface 101, and angled trench 104 to which the magnet track is attached. The acute angle of the trench carrying the track to achieve equal preload on equal sized bearings is preferably about 25 degrees to provide equal preload force to all the bearings, but it can be biased to accommodate offset loads that are to be applied to the carriage. The surface 101 is preferably orthogonal to surfaces 102 and 103, but it could be inclined at an angle to facilitate molding or replicating of the surfaces from a master.

FIG. 6 illustrates two such assemblies 401 and 402, wherein the rail 100A would be fixed, and the carriage 300A is position-controlled and preloaded by the linear electric motor 200A. This, in effect, creates an X-axis. A Y-axis is created by assembly 402, where rail 100B is attached to the X-axis carriage 300A, and the Y-axis carriage 300B is position-controlled and preloaded by the linear electric motor 200B. Even though the force of gravity would try to separate the carriages from the rails, the high attractive force between the motor coils attached to the carriages and the magnet tracks attached to the rails prevents this. Any one of a multitude of end effectors typically used by robots, may also be employed.

Figure 8:
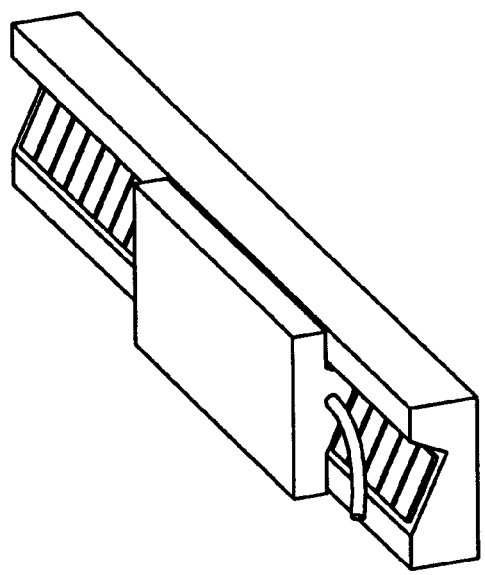
FIGS. 7 and 8 are a spreadsheet (input and output pages) showing the calculations useful to size the motor and bearing pads.
Figure 7:
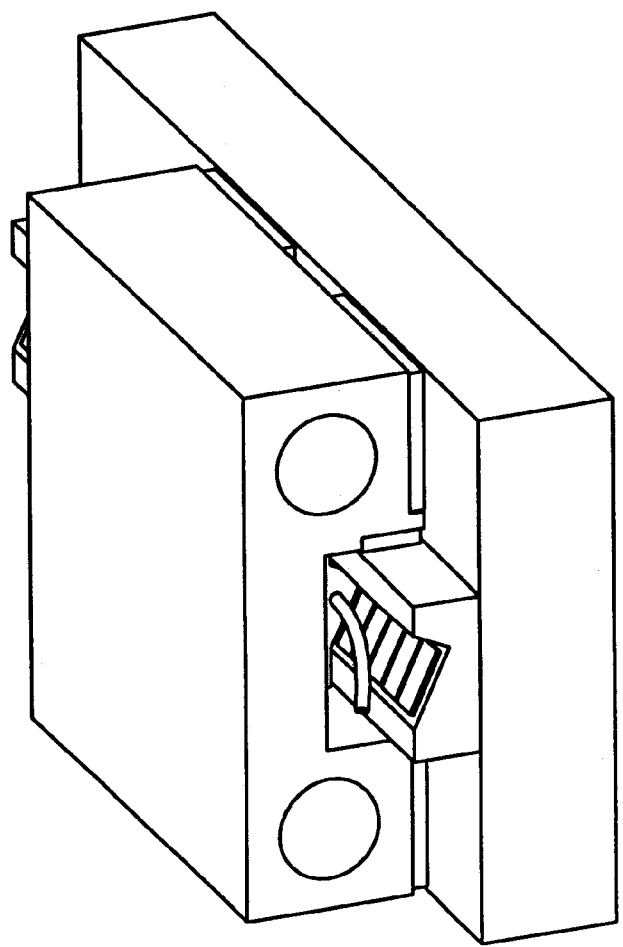

FIGS. 7 and 8 are pages of a typical illustrative spreadsheet that an engineer skilled in the art of bearing preload would create to size the bearings and the preload force of the invention. It clearly shows that for modest forces, this concept can achieve very high speed motion (high accelerations); thus making it most attractive for high speed robotic applicationsand the like, particularly for use in cleanrooms and other annular locations.

In some cases, precision linear motion is required, without precision positioning capability offered by a linear electric motor. In theses cases, if the rail 100 is of a ferrous alloy, and thus inherently magnetic, a separate magnet track can be eliminated, and the motor coils 201 can be replaced by a permanent magnet assembly to preload the bearings. If the rail 100 is not ferrous, for example if made of aluminum or alumina, then the magnet track 200 can be replaced with a ferrous plate to which the permananet magnet assembly is attracted. The carriage would then be positioned by any of several means known to those skilled in the art, such as a belt drive or ballscrew.

It should also be noted that the preferred embodiement has a concave trench. In some cases, where the stiffness of the axis of utmost concern, a convex mounting of the magnet track can be used. It is known to those skilled in the art how to calculate the net result of all forces involved, and as shown in FIGS. 7 and 8 how to ensure that the bearings always remain preloaded.

It is therefore anticipated that further modifications of the invention will also readily occur to persons skilled in the art, and all such are deemed to fall within the spirit and scope of the invention as defined by the appended claims.

What is claimed is:

1. A linear motion carriage-rail system having longitudinally extending opposing inner planar carriage and rail surfaces between which linear motion bearings are disposed to enable the carriage to move longitudinally over the rail, the system having, in combination, a linear electric motor having a forcer coil part and a longitudinally extending magnet track part; the forcer coil part being fixed to an intermediate region of said planar carriage inner surface to move the carriage longitudinally over the rail; and with the magnet track being fixed to and intermediately longitudinally along the inner planar surface of the rail but oriented at an acute angle to the plane of the rail surface, such that the attractive force between said motor parts approximately equally preloads the bearings as the carriage is moved over the rail, wherein the inner planar carriage surface is L-shaped to provide also an orthogonal surface parallel to and overlapping the adjacent side of the rail, and between which orthogonal surface and rail side, further linear motion bearings are interposed, and wherein the motor magnet track is disposed within a longitudinal intermediate trench along the inner plane rail surface, with the track in the trench angled at said acute angle.

2. The system of claim 1 wherein the linear motor attractive force preloads all said bearings, with the bearings between the first—named opposing inner planar carriage and rail surfaces controlling three degrees of motion of the carriage—vertical, pitch and roll motion—, and the bearings between the carriage orthogonal surface and said adjacent side of the rail restraining two further degrees of motion- horizontal and yaw motions of the carriage—, thereby controlling five degrees of carriage freedom.

3. The system of claim 2 wherein the preloads of the bearings by the linear motor attractive force enables providing the carriage with high stiffness in said five degrees of freedom.

4. The system of claim 1 wherein said acute angle is of the order of about 25 degrees.

5. The system of claim 1 wherein the linear motion forcer coil part is fixed within a correspondingly angled groove at said intermediate region of said planar carriage inner surface and is there held with a gap separating it from the magnet track over which it is parallely moved as the carriage is forced along the rail.

6. A system comprised of a linear motion fixed bearing rail, a carriage movable along the rail, and linear motion bearings disposed therebetween to provide five degrees of stiffness for the carriage, and a linear electric motor having two magnetically attractive parts carried respectively by the rail and carriage and oriented with respect to the bearings such that the attractive magnetic force between the two parts of the linear electric motor acts to preload all the bearings, wherein the bearings run on three opposing carriage and rail bearing surfaces, two of which are parallel, and with the third orthogonal to the first two; and wherein the linear electric motor is oriented at an angle of about 25 degrees with respect to the parallel bearing surfaces.

7. A system comprised of a linear motion fixed bearing rail and a plurality of fluid bearings therebetween, a carriage moveable thereover, the bearings being distributed to run on three opposing carriage and rail bearing surfaces, two of which are parallel, and the third of which is orthogonal to the first two, a linear electric motor forcer, a cooperative linear electric motor magnet track, and a trench in the rail disposed at an angle to the bearing surfaces into which the linear electric motor magnet track is fastened, the motor forcer being mounted to the opposing carriage surface in a correspondingly angled groove, such that when the carriage is supported by its bearings and allowed to move along the rail, the attractive force between the motor forcer and the magnet track keeps the bearings preloaded and thus enables the carriage to move with a high degree of stiffness in five degrees of freedom, while being free to move along the rail in the remaining degree of freedom as controlled by the linear electric motor.

8. A method of preloading linear motion bearings disposed between opposing fixed and movable surfaces each comprising a pair of orthogonal planar surfaces, that comprises, positioning a permanent magnet linear electric coil motor with a high attractive force between the coils and a magnet, upon and at an acute angle incline to the planar surfaces, such that the attractive force creates a preload force on each of the bearings, wherein one of the pair of orthogonal planar surfaces comprises top and side L-shaped wall surfaces movable over the other of the pair of orthogonal planar surfaces which constitute the top surface and side surface of a rail along and over which the carriage is moved and wherein the electric motor coils are fixed inside the top carriage wall surface to move with the carriage, and the magnet extends as a track fixed to the top surface of the rail, with the track and coils tilted at said acute angle to the planar top surfaces, and wherein the track extends in a trough along the rail and the coils are recessed in the inside of the top carriage wall.

9. The method of claim 8 wherein the are L-shaped surfaces provide also orthogonal planar surfaces parallel to overlapping adjacent sides of the rail, and interposing linear motion bearings therebetween.

10. The method of claim 8 wherein the bearings between the opposing surfaces control three degrees of motion of—vertical, pitch and roll motion—, and the bearings between the orthogonal surface and said side of the rail restraining two further degrees of motion—horizontal and yaw motions—, thereby controlling five degrees of freedom.

11. The method of claim 10 wherein a linear motor attractive force preloads all the bearings providing high stiffness in said five degrees of freedom.

* * * * *